(12) United States Patent
Nakamura et al.

(10) Patent No.: US 6,708,505 B2
(45) Date of Patent: Mar. 23, 2004

(54) AIR CONDITIONER

(75) Inventors: Hiroo Nakamura, Tsuchiura (JP);
Hidenori Yokoyama, Oohira (JP);
Masayuki Nonaka, Nagareyama (JP);
Atsushi Ohtsuka, Oyama (JP);
Tsutomu Kurokawa, Kuzuu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/197,460

(22) Filed: Jul. 18, 2002

(65) Prior Publication Data

US 2003/0033392 A1 Feb. 13, 2003

(30) Foreign Application Priority Data

Aug. 8, 2001 (JP) ........................ 2001-240053

(51) Int. Cl.⁷ .......................... F25B 49/00; G05D 23/00
(52) U.S. Cl. .......................................... 62/125; 236/51
(58) Field of Search ..................... 236/51, 94; 62/125, 62/126; 165/201, 11.1

(56) References Cited

U.S. PATENT DOCUMENTS 5,271,453 A * 12/1993 Yoshida et al. ............. 165/22
5,751,948 A * 5/1998 Dolan et al. ........... 395/185.07
5,831,852 A * 11/1998 Cahill-O'Brien et al. ... 364/188
6,330,806 B1 * 12/2001 Beaverson et al. ........... 62/201
6,393,848 B2 * 5/2002 Roh et al. ..................... 62/126
6,453,687 B2 * 9/2002 Sharood et al. ............... 62/127
6,453,689 B2 * 9/2002 Wada ........................... 62/175
2001/0048030 A1 * 12/2001 Sharood et al. ............ 236/49.3
2002/0189267 A1 * 12/2002 Singh et al. .................. 62/126
2003/0005710 A1 * 1/2003 Singh et al. .................. 62/129

FOREIGN PATENT DOCUMENTS

JP          A-10-132362          5/1998

* cited by examiner

*Primary Examiner*—Marc Norman
(74) *Attorney, Agent, or Firm*—Antonelli, Terry, Stout & Kraus, LLP

(57) ABSTRACT

An air conditioner and a control software updating system capable of easily updating and adding control software desired by a customer. An internet system including telephones and/or personal computers is provided between a service center and customers. Each of air conditioners is provided with a connection terminal for connection to a communication terminal. Software for controlling operation of the air conditioner is updated by using the internet or a memory card after explaining a control software to the customer and confirming the customer's desire.

6 Claims, 10 Drawing Sheets

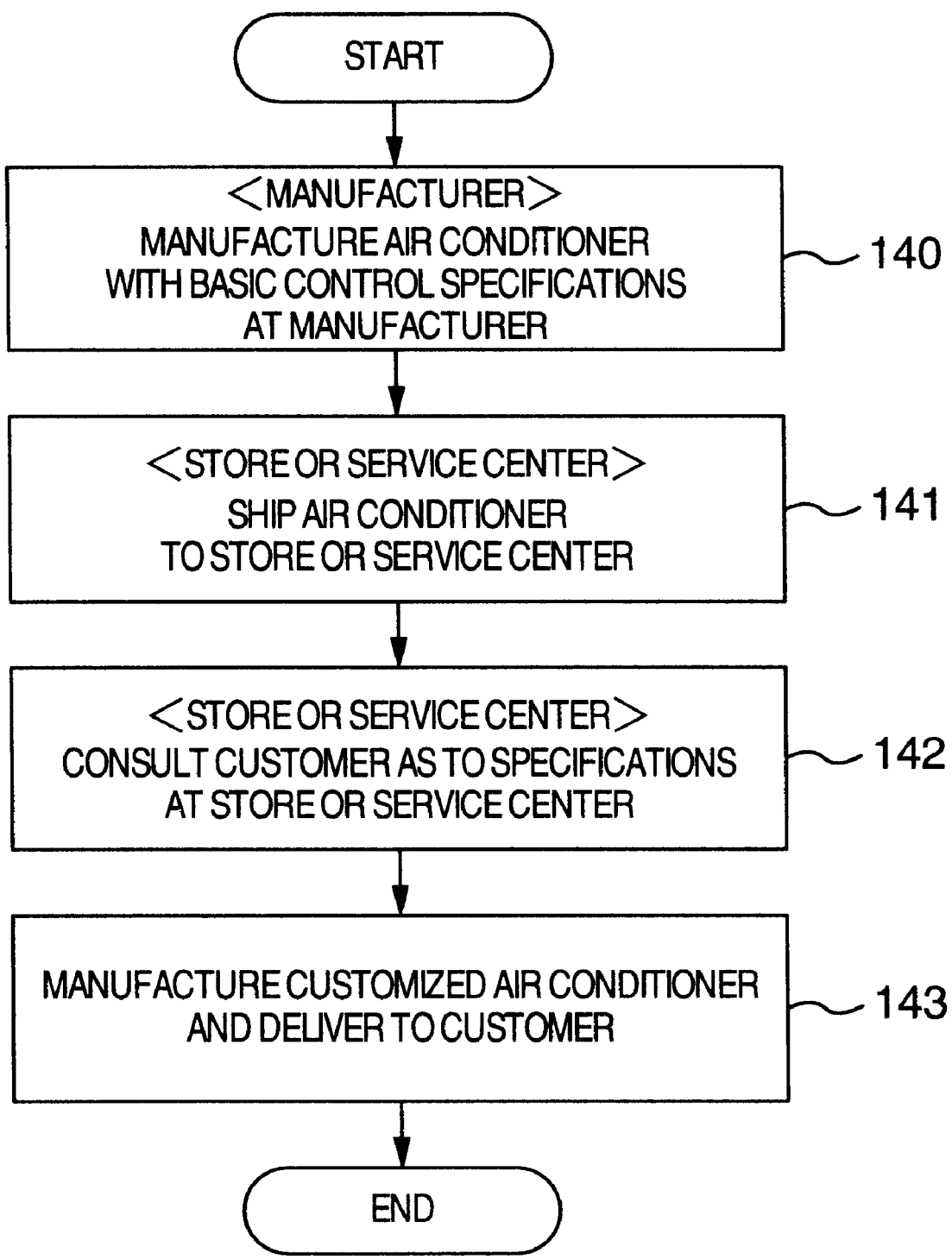

FIG.10

| | (a) WIDESPREAD TYPE | (b) STANDARD TYPE | (c) HIGH GRADE TYPE |
|---|---|---|---|
| RUNNING MODE | COOLING & HEATING | COOLING & HEATING & DEHUMIDIFICATION | COOLING & HEATING & DEHUMIDIFICATION & PAM INVERTER CONTROL |
| CYCLE STRUCTURE | COMPRESSOR, FOUR-WAY VALVE, OUTDOOR HEAT EXCHANGER, INDOOR HEAT EXCHANGER, RESTRICTION DEVICE | COMPRESSOR, FOUR-WAY VALVE, OUTDOOR HEAT EXCHANGER, DEHUMIDIFICATION-DEDICATED RESTRICTION DEVICE, INDOOR HEAT EXCHANGER, RESTRICTION DEVICE | COMPRESSOR, PAM INVERTER, FOUR-WAY VALVE, OUTDOOR HEAT EXCHANGER, DEHUMIDIFICATION-DEDICATED RESTRICTION DEVICE, INDOOR HEAT EXCHANGER, RESTRICTION DEVICE |
| DIFFERENCE IN HARDWARE — DEHUMIDIFYING VALVE | ABSENT | PRESENT | PRESENT |
| DIFFERENCE IN HARDWARE — PAM INVERTER | ABSENT | ABSENT | PRESENT |
| BASIC CONTROL SOFTWARE UPON SHIPPING | CONTROL OF ROTATION NUMBER (RPM) OF COMPRESSOR, DEPENDING ON DIFFERENCE BETWEEN PRESET AND DETECTED ROOM TEMPERATURES | CONTROL OF ROTATION NUMBER (RPM) OF COMPRESSOR, DEPENDING ON DIFFERENCE BETWEEN PRESET AND DETECTED ROOM TEMPERATURES / REHEAT/DEHUMIDIFICATION CYCLE | CONTROL OF ROTATION NUMBER (RPM) OF COMPRESSOR, DEPENDING ON DIFFERENCE BETWEEN PRESET AND DETECTED ROOM TEMPERATURES / REHEAT/DEHUMIDIFICATION CYCLE |
| ADDITIONAL CONTROL SOFTWARE | • TIMER FUNCTION<br>• OPERATION-WHILE-SLEEPING FUNCTION<br>• SETTING LOCK FUNCTION | • TIMER FUNCTION<br>• OPERATION-WHILE-SLEEPING FUNCTION<br>• SETTING LOCK FUNCTION<br>• LAUNDRY DRYING OPERATION<br>• DEW FORMATION PREVENTING OPERATION<br>• HIGH-POWER DEHUMIDIFICATION OPERATION<br>• COOLING-SIDE DEHUMIDIFICATION OPERATION<br>• DEHUMIDIFICATION-WHILE-SLEEPING OPERATION | • TIMER FUNCTION<br>• OPERATION-WHILE-SLEEPING FUNCTION<br>• SETTING LOCK FUNCTION<br>• LAUNDRY DRYING OPERATION<br>• DEW FORMATION PREVENTING OPERATION<br>• HIGH-POWER DEHUMIDIFICATION OPERATION<br>• COOLING-SIDE DEHUMIDIFICATION OPERATION<br>• DEHUMIDIFICATION-WHILE-SLEEPING OPERATION<br>• POWERFUL OPERATION |

AIR CONDITIONER

BACKGROUND OF THE INVENTION

The present generally relates to an air conditioner. More particularly, the invention is concerned with a hardware configuration and a method for rewriting control software for the air conditioner.

In recent years, in accompanying the rapid progress in the technical fields of microcomputers and software, functional improvement or version-up of control software for the air conditioner is performed at a short time span when compared with the use life of the hardware. Thus, by rewriting the software for the control method for the air conditioner, the functions or operations thereof can be updated for improvement. As a known method of carrying out a process of rewriting the control software with high efficiency, there may be mentioned one disclosed, for example, in JP-A-10-132362. More specifically, disclosed in this publication is a service data access scheme according to which air conditioners and a service station are interconnected via a network of portable or ordinary telephones and/or personal computers so that abnormality data can automatically be sent to the service station from the air conditioner which is imparted with a call function and that control software for the air conditioner can automatically be delivered from the service station for speedily coping with repairs and version-up of the software for the air conditioner.

In this conjunction, it is however noted that whether the control software for the air conditioner is to be updated to a newly developed one depends on whether the customer desires it or not. However, concerning the matter as to how to cope with the customer's desire, no consideration is paid in the invention disclosed in JP-A-10-132362. Besides, relatively high technique is demanded for automatically acquiring the information concerning the customer's desire through the medium of the network of the telephones and/or the personal computers. Consequently, if the customer has to engage himself or herself in manipulating the software for the telephone or the personal computer, this means that very troublesome procedure is involved particularly for those who are of advanced age as well as those who are not familiar with the information technology in general.

SUMMARY OF THE INVENTION

In the light of the state of the art described above, it is an object of the present invention to provide an air conditioner which allows version-up to newly developed control software to be easily realized even by persons who are of advanced age or not familiar with the information technologies concerning the personal computers, software and the like while adopting to some extent dialogical interactions between the customers and the service center (service station).

In this conjunction, it is further noted that some of the air conditioners developed recently are imparted with a multiplicity of control functions some of which are considered to be unnecessary although it depends on the customers. Under the circumstances, it is a second object of the present invention to provide an air conditioner which is initially imparted with only the basic control functions such as room temperature control and the like as the standard control functions with the other control function(s) being additionally provided later on in accordance with the customer's desire, to thereby customize the control software in conformance with the customer's demand while allowing the control software to be updated whenever new control method has been developed.

In view of the first object of the present invention, there is provided according to an aspect of the present invention an air conditioner which includes a connection terminal connected through a circuit or line to a service center having a storage for storing identification information and control software for the air conditioner, and a memory for storing the control software and the identification information transferred from the service center, wherein cycle structure information is registered in the identification information of the service center.

Further, for achieving the first object mentioned above, the present invention provides an air conditioner which includes a connection terminal which can be connected through a circuit to a service center having a storage for storing identification information and control software for the air conditioner, and a memory for storing the control software and the identification information transferred from the service center, wherein the air conditioner is imparted with a function for determining whether the control software transferred from the service center is usable or not.

Furthermore, for achieving the first object mentioned above, the present invention provides an air conditioner which includes a connection terminal to which a memory card storing therein control software can be connected, the memory card being prepared by a service center having a storage for storing identification information and control software for the air conditioner, and a memory for storing control software and identification information stored in the memory card delivered from the service center, wherein cycle information is registered in the identification information of the service center.

Moreover, for achieving the first object mentioned above, the present invention provides an air conditioner which includes a connection terminal to which a memory card storing therein control software can be connected, the memory card being prepared by a service center having a storage for storing identification information and control software for the air conditioner, and a memory for storing control software and identification information stored in the memory card delivered from the service center, wherein the air conditioner is imparted with a function for determining whether the control software transferred from the service center is usable or not.

On the other hand, for achieving the second object mentioned above an air conditioner which includes a compressor, a four-way valve, an outdoor heat exchanger, a restriction device and an indoor heat exchanger as a cooling cycle, wherein the air conditioner is imparted with only a cooling control function with operation of the four-way valve being invalidated.

Additionally, for accomplishing the second object mentioned above, the present invention provides an air conditioner which includes a compressor, a four-way valve, an outdoor heat exchanger, a restriction device, duplexed indoor heat exchangers and a dehumidification-dedicated restriction device disposed between the duplexed indoor heat exchangers for effectuating a cooling cycle, wherein the air conditioner is imparted with only a cooling control function with operations of the four-way valve and the dehumidification-dedicated restriction device being invalidated.

Additionally, for achieving the second object mentioned above, the present invention provides an air conditioner which includes a compressor, a four-way valve, an outdoor heat exchanger, a restriction device and an indoor heat exchanger and an inverter for controlling rotation number of the compressor wherein the air conditioner is imparted with a function for controlling a rotation number of the compressor in dependence on a temperature difference between a preset room temperature and a detected room temperature and a function for allowing other control function(s) to be inputted externally.

Moreover, for achieving the second object mentioned above, the present invention provides an air conditioner which includes a compressor, a four-way valve, an outdoor heat exchanger, a restriction device, duplexed indoor heat exchangers and a dehumidification-dedicated restriction device disposed between the duplexed indoor heat exchangers and an inverter for controlling rotation number of the compressor, wherein the air conditioner is imparted with a function for controlling a rotation number of the compressor in dependence on a temperature difference between a preset room temperature and a detected room temperature, a function for controlling said dehumidification-dedicated restriction device and a function for allowing other control function to be inputted externally.

With the arrangements of the air conditioner according to the present invention as described above, version-up of the control software to newly developed one can be carried out even by ordinary people and persons of advanced age who are not familiar with the information technology concerning the personal computers, software and the like by adopting dialogical interaction between customers and the service center (service station) to some extent.

Further, in the air conditioner provided by the present invention, control functions for the air conditioner can be customized in conformance with the customer's demands and updated when new control method has been developed.

Other objects, features and advantages of the invention will become apparent from the following description of the embodiments of the invention taken in conjunction with the accompanying drawings.

BRIEF DESCRIPTION OF THE DRAWINGS

In the course of the description which follows, reference is made to the drawings, in which:

FIG. 6 is a schematic block diagram showing a configuration of a control software update system for an air conditioner for which a memory card is made use of;

FIG. 9 is a flow chart for illustrating a processing procedure for customization of the air conditioner; and FIG. 10 is a view showing, by way of example, contents of customization of control software for a room air conditioner.

DESCRIPTION OF THE EMBODIMENTS

Figure 1:
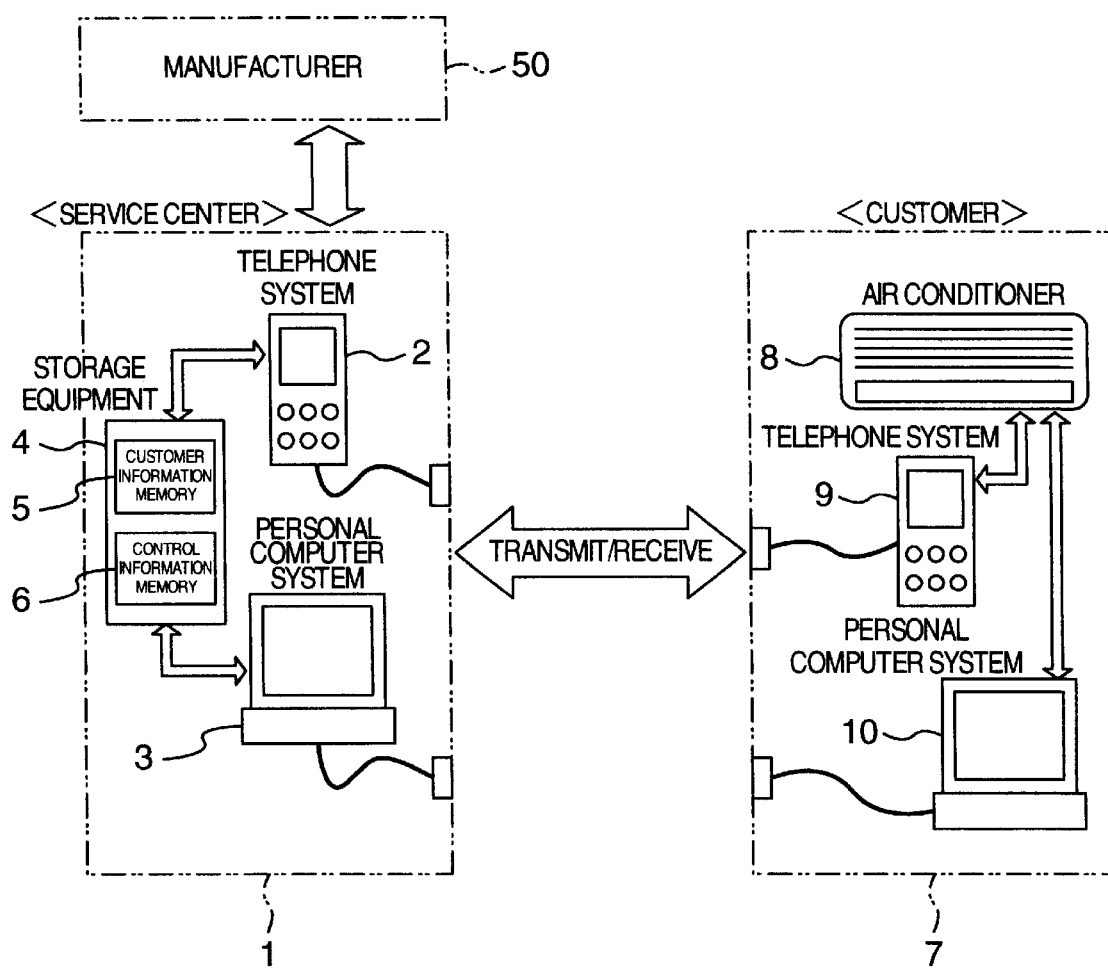
FIG. 1 is a schematic block diagram showing a configuration of a control software update system for an air conditioner according to a first embodiment of the present invention.

The present invention will be described in detail in conjunction with what is presently considered as preferred or typical embodiments thereof by reference to the drawings. FIG. 1 is a schematic block diagram showing a system configuration of a control software update system for an air conditioner according to a first embodiment of the present invention. In the figure, reference numeral 50 generally denotes a manufacture of the air conditioner, and numeral 1 denotes a service center (including a store) which is in charge of sales, updating of control software, repair/maintenance and the like. There may be installed at the service center 1 a telephone system 2 such as a portable telephone, a personal handyphone system, an ordinary telephone or the like and/or a personal computer system 3 connected externally through a network. Further, connected to the telephone system 2 and the personal computer system 3 a storage equipment 4 comprised of a customer information memory 5 for storing identification data (type of the air conditioner, control software specifications, addresses of the customers (names, telephone numbers, mail addresses, etc.) for discriminatively identifying customers and air conditioners and a control information memory 6 for storing control software and others. Reference numeral 7 generally designates a system provided on the side of a customer, which system is comprised of an air conditioner 8, a telephone system 9 such as a portable telephone, a personal handyphone or an ordinary telephone, a personal computer system 10 connected to a network and others. The components mentioned above cooperate to constitute an internet system as a whole which includes the service center and the customers.

Figure 2:
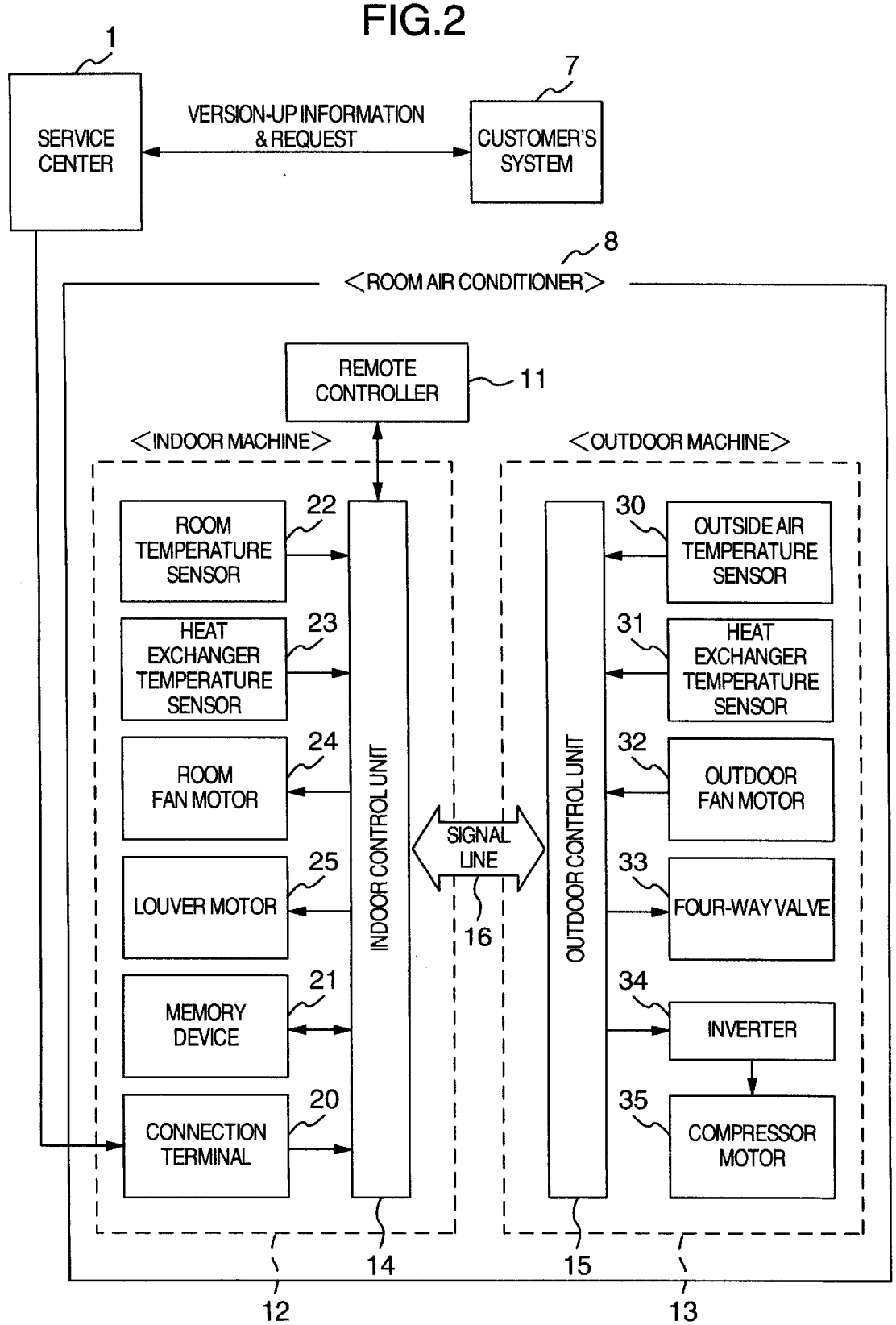
FIG. 2 is a block diagram showing a control system on the side of an air conditioner shown in FIG. 1.

FIG. 2 is a block diagram showing a control system of an air conditioner 8 of a separate type which includes an indoor machine 12 equipped with a remote controller 11 and an outdoor machine 13. Referring to FIG. 2, the indoor machine 12 is composed of an indoor control unit 14 which incorporates a CPU (Central Processing Unit). Similarly, the outdoor machine 13 includes an outdoor control unit 15 which also incorporates a CPU. Further, the indoor control unit 14 and the outdoor control unit 15 are interconnected via a signal line 16 for data transmission.

The indoor machine 12 includes in addition to the indoor control unit 14 a connection terminal 20 for connection of a communication terminal for receiving input information from the service center 1, a rewritable memory device 21 for storing control software such as version-up software or the like, a room temperature sensor 22, a heat exchanger temperature sensor 23, a room fan motor 24 and a louver motor 25.

On the other hand, the outdoor machine 13 includes in addition to the outdoor control unit 15 an outside air temperature sensor 30, a heat exchanger temperature sensor 31, an outdoor fan motor 32, a four-way valve 33 for changing over cooling operation and heating operation, and an inverter 34 for controlling rotation number (rpm) of a compressor motor 35.

At this juncture, operation of the air conditioner will be described briefly. With the aid of the remote controller 11, operation mode such as cooling, heating, dehumidification or the like, a room temperature, air quantity, wind direction and others can be set. Of these preset quantities, the operation mode signal is sent to the outdoor control unit 15 from the indoor control unit 14, in response to which the outdoor control unit 15 performs changeover control of the four-way valve 33 and others.

The indoor control unit 14 is designed to determine a power supply frequency for driving the compressor motor 35 in dependence on temperature difference between a room temperature set by the remote controller 11 and a detected room temperature derived from the output of the room temperature sensor 22 to thereby send a frequency command to the outdoor control unit 15 to which the inverter 34 is connected by way of the signal line 16. The inverter 34 serves to convert an AC power into a DC power and then converts reversely the DC power into the AC power in response to an ON/OFF control signal issued from the outdoor control unit 15, the AC power being then supplied to the compressor motor 35. Additionally, the indoor control unit 14 issues a speed command to the room fan motor 24 for controlling the rotation number thereof by taking into account both the temperature of the heat exchanger detected by the heat exchanger temperature sensor 23 and the air quantity set by the remote controller 11. Besides, the indoor control unit 14 controls the wind direction by issuing a command indicating the wind direction set by the remote controller 11 to the louver motor 25.

On the other hand, the outdoor control unit 15 is designed to control the rotation number of the outdoor fan motor 32 by issuing thereto a speed command in response to the outside air temperature detected by the outside air temperature sensor 30.

Figure 3:
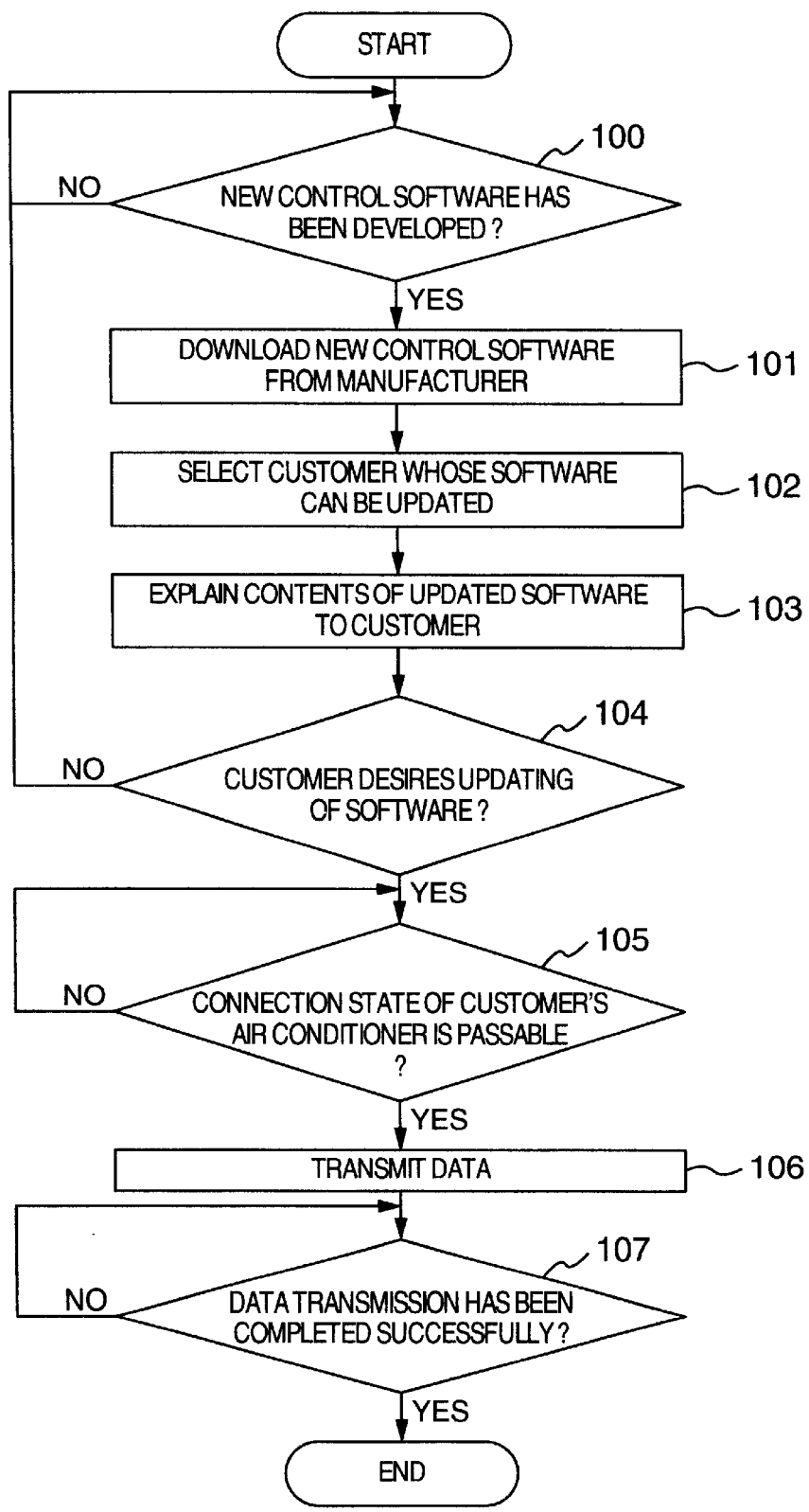
FIG. 3 is a flow chart for illustrating a processing for updating control software for the air conditioner as executed on the side of a service center shown in FIG. 1.

Next, in conjunction with the control software update system shown in FIG. 1, a method of updating the control software for the air conditioner will be described. Incidentally, FIG. 3 shows a flow chart for illustrating a method of updating control software for the air conditioner on the service center side.

At the service center 1, it is constantly supervised whether new control software has been created or not by a manufacturer or maker (step 100). Whenever new control software has been made available, it is down-loaded into the control information memory 6 through the medium of the telephone system 2 or the personal computer system 3 (step 101). Subsequently, at the service center 1, the customers capable of being updated to the new control software are selected by making use of the customer data stored in the customer information memory 5 (i.e., cycle information concerning the cycle structure of the air conditioner owned by the customer. The air conditioner which is not equipped with a dehumidification-dedicated restriction device described later on can not be added with dehumidifying function and associated control functions) (step 102). In succession, the contents of the new control software are dialogically explained to the customer(s) through the telephone system 2 or the personal computer system 3 by answering questions issued from the customer (step 103), and the customer is asked as to whether he or she wants updating to the new control software (step 104). When the customer desires updating, the connection state of the communication terminal at the telephone system 9 or the personal computer system 10 of the customer's system 7 is checked from the side of the service center 1 (step 105), and then the updated software is transmitted to the customer's system 7 when it is confirmed that the data transmission is possible (step 106). Thereafter, a confirmation signal (acknowledge signal) messaging that the control software has been received by the customer is waited for (step 107). When the transmission/reception of the confirmation signal has been done without involving any problem, then the data transfer comes to an end. Although, the above description has been made of the new control function, it goes without saying that the data transmission can equally be performed for the software for the basic control functions and the operating control functions.

Figure 4:
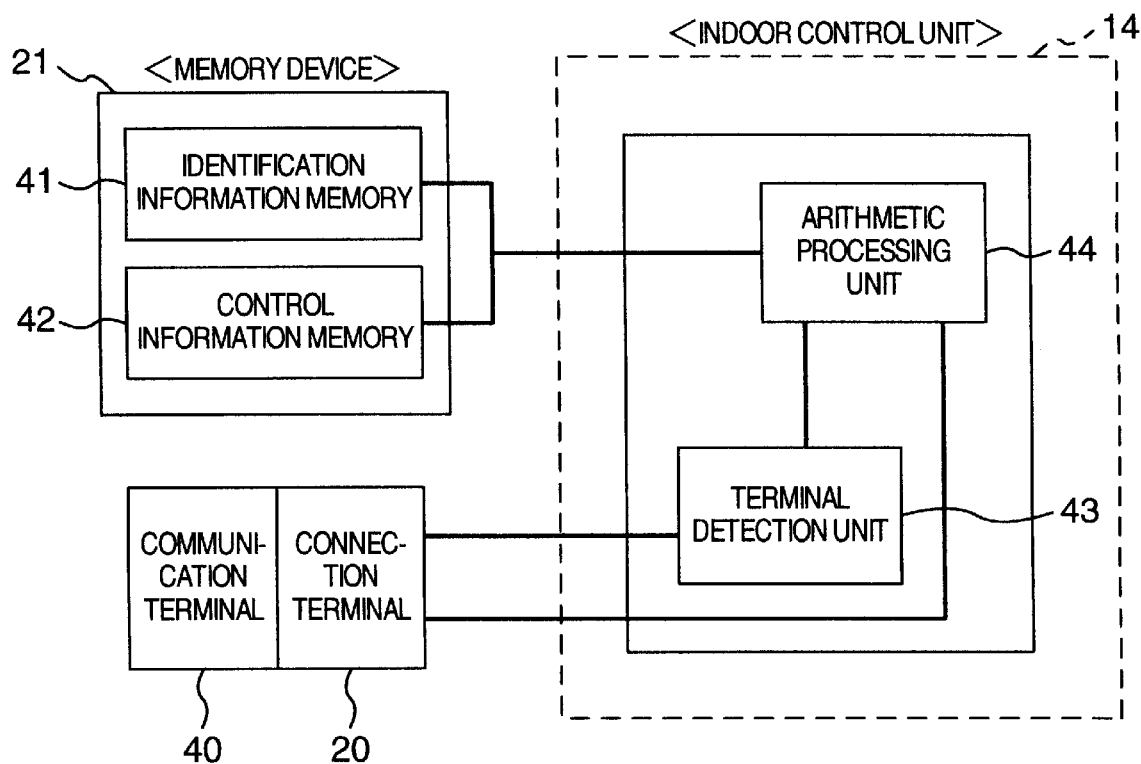
FIG. 4 is a block diagram showing a data processing unit incorporated in an indoor machine of the air conditioner shown in FIG. 1.
Figure 5:
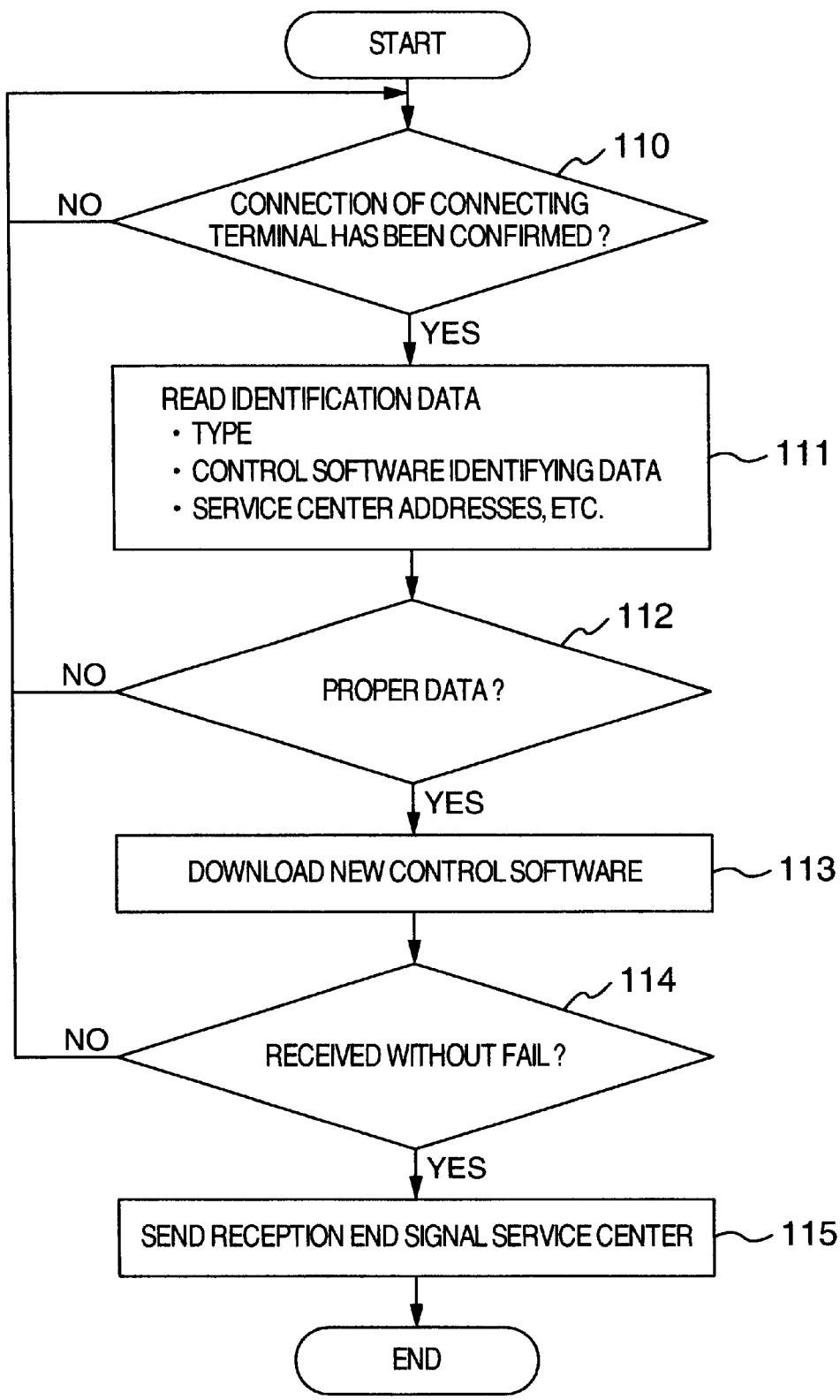
FIG. 5 is a flow chart for illustrating a processing procedure executed on the side of the customer's air conditioner.

Next referring to a block diagram shown in FIG. 4 and a flow chart shown in FIG. 5, description will made in detail of the transactions performed between the service center 1 and the customer's system 7 upon updating of the control software and the operations of the air conditioner 8, the connection terminal 20, the memory device 21 and the indoor control unit 14.

Referring to FIG. 4, the connection terminal 20 is electrically connected to a communication terminal 40 which leads to the telephone system 9, the personal computer system 10 or the like. The memory device 21 is composed of an identification information memory 41 destined for storing identification data (type of the air conditioner, specifications of control software, addresses (name/telephone number/mail address/etc.) of the service center) for discriminatively determining whether the data received is appropriate to the air conditioner concerned, and a rewritable control information memory 42 for storing therein the control software for operating the air conditioner with comfortableness. As the rewritable memory, an EEPROM (Electrically Erasable and Programmable ROM), a flash memory or the like may be employed. The indoor control unit 14 is equipped with a terminal detection unit 43 for detecting whether or not the communication terminal 40 is connected to the connection terminal 20 and an arithmetic processing unit 44 for discriminatively determining whether the received data is the data destined for the concerned air conditioner and for fetching the control software.

FIG. 5 is a flow chart for illustrating in detail a processing procedure executed by the indoor control unit 14 incorporated in the customer's air conditioner 8. In this processing, the indoor control unit 14 firstly makes decision as to whether the communication terminal 40 is connected to the connection terminal 20 (step 110), fetches the sent identification data (type, address of the service center, software identification data for identifying the update software for the concerned air conditioner (the control software which can not be effectuated through the cycle set by the customer is not accepted, as described hereinbefore)) (step 111), makes decision as to whether or not the data is destined for the concerned air conditioner (step 112) and fetches the control software if so (step 113). Thereafter, it is determined whether or not all the data inclusive of the final one have been received without any problem (step 114). If all the data has been received without fail, the reception end data is sent back to the service center (step 115), whereupon the processing comes to an end.

Through the procedure or method described above, the customer is capable of making decision as to whether or not updating of the control software is necessary for his or her air conditioner after having understood the contents of the new control software, whereon the updating to the new control software can automatically be effectuated from the service center without imposing substantially any troubling to the customer. Further, the service center can speedily cope with the updating to a next new control method by supervising and managing development of new control data for the customer.

By the way, it should also be added in conjunction with the processing procedure shown in FIG. 5 that instead of connecting the telephone system 9 or the personal computer system 10 to the connection terminal 20, the customer may easily update the control software by connecting to the connection terminal 20 a memory card in which the control software is written. In that case, the memory card should be so designed as to store the identification data of the corresponding or relevant machine and new control software.

Figure 6:
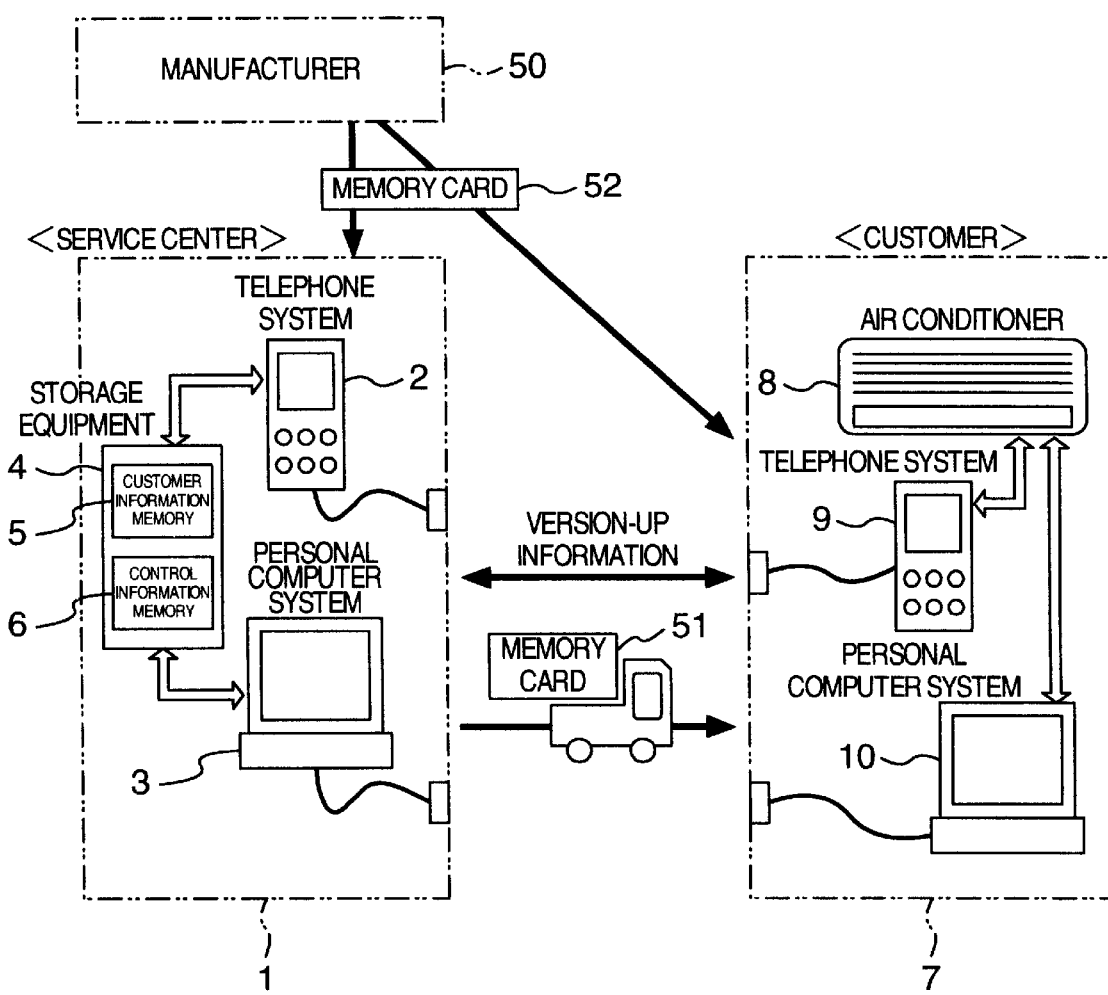

In that case, transactions performed between a manufacturer 50 and the service center 1 may be same up to the processing step 105 shown in FIG. 3 in the system configuration between the manufacturer 50 and the service center 1 shown in FIG. 1. Subsequently, the updated control software is received from the manufacturer 50 by making use of the telephone system 2 or the personal computer system 3, whereon a memory card 51 (as shown in FIG. 6 later) in which the updated control software has been written is prepared at the service center to be handed to the customer.

Figure 7:
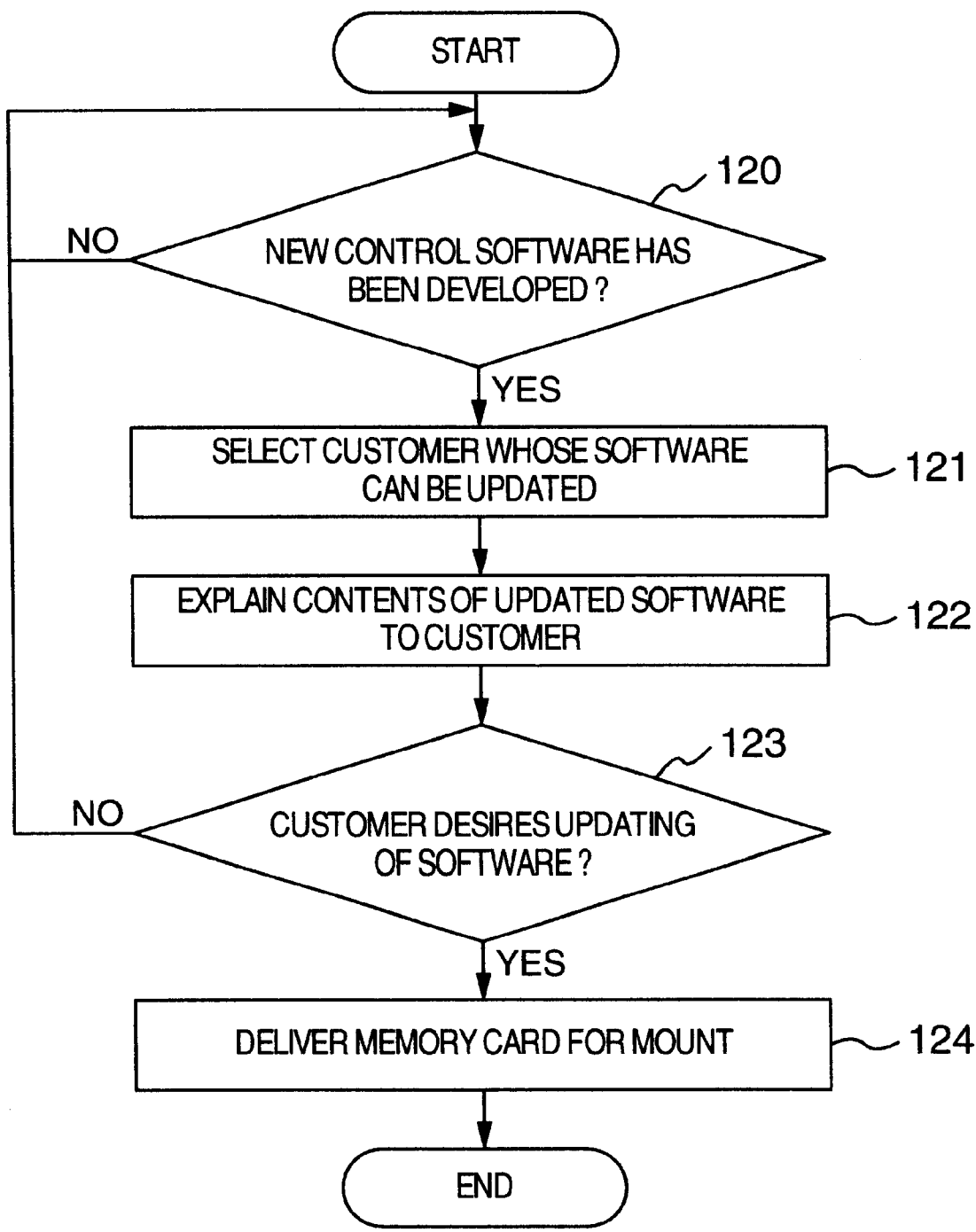
FIG. 7 is a flow chart for illustrating a processing for updating control software of the air conditioner executed on the side of a service center shown in FIG. 6.

As another method, it is conceived to write the control software in the memory card 52 on the side of the manufacturer 50. In that case, the system shown in FIG. 1 will have to be modified as shown in FIG. 6. In this figure, components or parts same as or equivalent to those described hereinbefore by reference to FIG. 1 are denoted by like reference numerals. The system shown in FIG. 6 differs from that shown in FIG. 1 in the respects that the new control software to be transferred from the manufacturer 50 to the service center 1 is stored in memory card 52 and that the updated software is transferred to the customer's system 7 from the service center 1 through the medium of the memory card 51. Correspondingly, the flow chart shown in FIG. 3 is modified, as illustrated in FIG. 7. More specifically, upon reception of the information of the new control software (step 120), the service center 1 selects the customer (step 121) susceptible to updating the software and introduces the contents of the new control software to the customer (step 122). Upon reception of the request for version-up from the customer (step 123), service for delivering the memory card 51 carrying the new control software to the customer is performed (step 124). Of course, the memory card 52 may be sent to the customer as memory card 51 by way of the service center 1 or alternatively delivered directly to the customer from the manufacturer 50.

Next, description will be directed to the operations of the customer and the air conditioner in the case of the system where the control software is delivered in the form of the memory card 51; 52.

Figure 8:
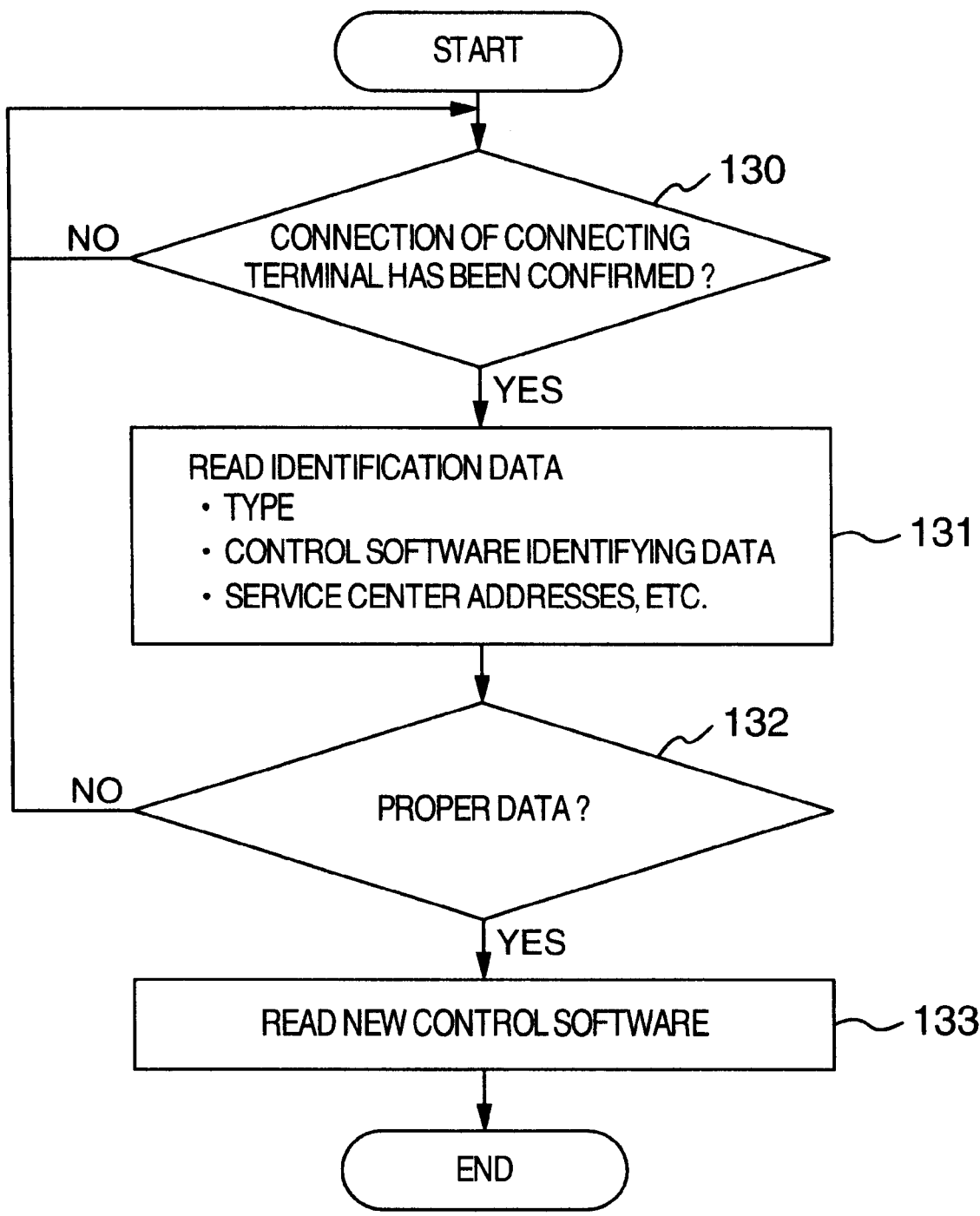
FIG. 8 is a flow chart for illustrating a processing procedure executed on the side of a customer in the system shown in FIG. 6.

The hardware configuration of the air conditioner 8 is same as to one described previously by reference to FIGS. 2 and 4 except that the connection terminal 20 is designed for accommodating or receiving the memory card and that the communication terminal 40 is replaced by the memory card (although not shown). The processing procedure for updating the software is carried out as illustrated in the flow chart of FIG. 8. Referring to FIG. 8, the indoor control unit 14 confirms the connection state of the memory card to the connection terminal 20 (step 130), reads out the identification data written in the memory card (step 131), makes decision as to whether the identification data as read out is identical with the identification data written in the identification information memory 41 of the indoor machine 12 (step 132), writes the control software in the control information memory 42 if the identification data are same (step 133) and then the indoor control unit 14 operates the air conditioner 8 in accordance with the updated control software written in the control information memory 42.

Further, the memory card itself may be used as the control software memory. In that case, the memory device 21 incorporated in the indoor machine 12 shown in FIG. 4 is rendered unnecessary, which in turn means that the steps 131, 132 and 133 shown in the flow chart of FIG. 8 can be spared. The indoor control unit 14 reads out the new control software from the memory card after checking the connection state of the memory card to thereby operate the air conditioner 8 in accordance with the new control software.

In this case, the memory device 21 mentioned previously by reference to FIGS. 2 and 4 can be spared although the reliability as to the identity of data destination may be degraded more or less. However, the cost of the air conditioner 8 can correspondingly be reduced.

In the case where the memory card is used as described above, the control for the air conditioner 8 can be updated to the new control method in conformance with the customer's request substantially without bothering the customer, as in the case of the new software updating procedures described hereinbefore by reference to FIGS. 1 to 5.

At this juncture, it is noted that the air conditioner susceptible to updating of the control software described so far may be manufactured with the necessary minimum control specifications so that the control software can be customized in conformance with the customer's request when the air conditioner is sold.

This procedure will be described by reference to the flow chart shown in FIG. 9. The manufacturer 50 manufactures as the finished product the air conditioner for which the fundamental or basic control(s) can be carried out (step 140) and ships the air conditioner to a store or a service center (step 141). At the store or the service center, the functions which can be additionally incorporated in the basic air conditioner are explained to the customer to thereby make clear what the customer desires for the air conditioner (step 142). In conformance with the specifications which meet the customer's desire, the control method for the air conditioner is customized in situ at the store or the service center, whereon the air conditioner as customized is delivered to the customer.

Further, the customization of the control software can be carried out on the manufacturer side. In that case, the function of the products and the control software which can be added are fully explained to the customer at the store or service center to thereby determine the specifications to be customized. The specifications as customized are then furnished to the manufacturer which responds thereto by finishing the product as the finally customized product to be sent to the store or service center and hence delivered to the customer. Of course, the customized product may directly be delivered to the customer directly from the manufacturer without intermediation of the store or the service center.

As the method of customizing the control software, the internet system such as telephone system or personal computer system may be made use of. Alternatively, the memory card may be used. In the case where the internet system is used, it is sufficient to connect the air conditioner 8 to the equipment installed at the service center in the system configuration shown in FIG. 1 (although illustration is omitted), while the hardware configuration of the air conditioner is similar to that described previously by reference to FIG. 2. On the other hand, in the case where the memory card is used, it is sufficient to connect the air conditioner 8 to the system of the manufacturer 50 or the service center 1 described previously by reference to FIG. 6. The hardware configuration of the air conditioner is essentially same as that shown in FIG. 2.

Next, description will be made of exemplary specifications of basic control software and additional control software in the control of the air conditioner on the presumption that the air conditioner is a cooling/heating room air conditioner which is equipped with a rotation number-controllable inverter-driven compressor and which can selectively be put into a cooling operation or a heating operation. The room air conditioner of this type may be classified into three types, i.e., a widespread type of low cost, a standard type of a standard cost and a high grade type of a high cost, as illustrated in FIG. 10. It is presumed that basically the hardware configuration can not be altered or modified later on.

The concept of the present invention underlying the embodiment now under consideration will be elucidated below. The air conditioner currently commercially available is imparted with numerous and various functions, some of which remains unused although it depends on the users. Further, in order to make available the desired function, it is necessary to purchase a product of what is called a high grade type machine. By way of example, the production ratio of the cooling-dedicated machine is currently low. However, there exist not a few people who think that it is sufficient that only the cooling function is available because they primarily rely on fossil fuels for the room heating in the winter season. Such being the circumstances, not a little burden is imposed on the manufacturers who are forced to fabricate various types of products which can ensure additional control functions in order to satisfy the customer's desires, as described below.

Under the circumstances, the present invention teaches to standardize the hardware configuration of the room air conditioners in a high-level hardware configuration (for plural machine types as the case may be), so that the customer can select the control functions which can be realized with the available hardware configuration. The price of the room air conditioner for sale is then determined by adding the cost required for the function to be additionally implemented to the basic price. In this way, the room air conditioners customized on a customer-by-customer basis can be prepared. This will be elucidated below in more detail.

The widespread type air conditioner of the basic hardware structure is comprised of a compressor, a four-way valve for changing over operation between the cooling mode and the heating mode, an outdoor heat exchanger, a restriction device, an indoor heat exchanger, an outdoor fan, a room fan and a PWM (Pulse Width Modulation) type inverter, as shown in FIG. 10 at column (a)

In this case, the basic control software may be so designed that in the cooling operation mode, the number of rotation of the compressor is increased in dependence on the temperature difference between the room temperature and the preset temperature (i.e., room temperature—preset temperature), wherein the preset temperature is set by the remote controller 11 for the indoor machine with the room temperature being detected by the room temperature sensor 22, whereas in the heating operation mode, the rotation speed of the compressor is so controlled as to increase as a function of the temperature difference (=preset temperature−room temperature).

Further, as the additional control software, there may be mentioned those for timer function (operation over a preset time period from a preset time point, operation till a preset time point in the night by making use of a clock or timepiece function, operation from a predetermined time point in the morning, etc.), an operation-while-sleeping function (operation in a silent mode with the wind direction being so adjusted that the user is not directly exposed to the wind, operation mode in which operation of the air conditioner is initially carried out in dependence on the temperature difference between the preset temperature and the room temperature and changed over to a feeble operation mode after lapse of a predetermined time to be stopped after lapse of the predetermined time,) and a setting lock function (in which the operation mode, wind velocity, wind direction and others are locked in the state set currently).

On the other hand, in the case of the standard type machine, the hardware configuration may be such as illustrated in FIG. 10 at column (b). In more concrete, differing from the popular or widespread type machine of the hardware configuration shown at the column (a), the indoor heat exchanger is divided into two sections between which a dehumidification-dedicated restriction device is disposed. In the dehumidification operation, the restriction device is opened with the dehumidification-dedicated restriction device being constricted, wherein the upstream indoor heat exchanger is operated as the condenser with the downstream indoor heat exchanger being operated as the evaporator so that the air heated by the condenser is mixed with the air cooled and dehumidified by the evaporator before being blown out, for thereby realizing dehumidification operation while evading excessive cooling.

With the basic control software for the standard type machine, the rotation number of the compressor is controlled in dependence on the difference between the preset room temperature and the air temperature, similarly to the case of the widespread type machine, while controlling the restriction device and the dehumidification-dedicated restriction device mentioned above for effectuating the dehumidification operation. In conjunction with the additional control software, there can be conceived various dehumidification-dedicated operation in addition to the timer function, the operation-while-sleeping function and the setting lock function mentioned previously in conjunction with the widespread type machine. By way of example, there may be mentioned a laundry drying operation (for drying speedily the laundry by increasing the rotation number of the compressor and the fan to thereby enhance the dehumidification capability), dew formation preventing operation (for preventing dew formation or condensation on windows and walls at dawn by performing the dehumidification operation for a predetermined time period before going to bed when the outside air temperature is low), high-power dehumidification operation (for lowering the humidity down to ca. 40% for the purpose of suppressing propagation of mould and ticks), cooling-side dehumidification operation (operation performed when the outside air temperature is relatively high in the rainy season by constricting more or less the restriction device for increasing the dehumidification capability while lowering the temperature of the air blown out), dehumidification-while-sleeping operation (for realizing comfortable air-conditioned environment in summer time, e.g. for sleeping by lowering the humidity without lowering excessively the temperature while making use of the timer function for automatically turning off the dehumidification-while-sleeping operation after lapse of a predetermined time).

In the case of the high grade machine, the hardware configuration is so implemented as to incorporate the PAM (Pulse Amplitude Modulation) type inverter for changing the rotation number of the motor by controlling the voltage applied thereto in addition to the hardware configuration of the standard type machine shown in FIG. 10, column (b). Refer to FIG. 10, column (c). Thus, in the high grade machine, the rotation number control range for the compressor can significantly be increased by adopting the PAM-type inverter. By virtue of this feature, the heating capability can remarkably be enhanced even when the outside air temperature is low while ensuring speedy starting of the heating operation.

The basic control software for this high grade machine is designed to carry out the method of controlling the rotation number of the compressor in dependence on the difference between the preset room temperature and the room air temperature and the dehumidification operation by controlling the restriction device and the dehumidification-dedicated restriction device similarly to the standard type machine.

Further, as the additional control software, there may be mentioned a powerful operation (i.e., operation in which the rotation number of the compressor is increased for a predetermined time period by taking advantage of the function of the PAM-type inverter when the cooling or heating capability is to be intensified significantly e.g. upon returning home and the like in addition to the timer function, the operation-while-sleeping function and the setting lock function and the laundry drying operation, the dew formation preventing operation, the powerful dehumidification operation, the cooling-side dehumidification operation and the dehumidification-while-sleeping operation described previously in conjunction with the standard type machine.

Incorporation of the basic control software in the widespread type machine, the standard type machine or the high grade machine and customization of the additional function control software can be carried out through the medium of the internet system or with the aid of the memory card in the system hardware configuration and the software updating methods described hereinbefore by reference to FIGS. 1 to 8.

Additionally, for the customized product delivered to the customer, the control method therefor can be updated to a newly developed one. In that case, the control software update processing can be carried out by resorting to the methods described hereinbefore by reference to FIGS. 1 to 5 when the internet is made use of. On the other hand, when the memory card is used, the methods described previously in conjunction with FIGS. 6 to 8 may be adopted together with the system configuration and the hardware configuration described hereinbefore.

In the foregoing, description has been made of the air conditioners in which the hardware configuration and especially the cycle structure are made to conform to the basic control functions (cooling, heating and dehumidification) and in which the additional control functions capable of being realized with the cycle structure can be selected. (For example, in the case of the standard type machine implemented in the hardware configuration capable of realizing reheating/dehumidification cycle, the laundry drying operation, dew formation preventing operation, the powerful dehumidification operation and the cooling-side dehumidification operation can be selected.) Next, description will be directed to an air conditioner according to another embodiment of the present invention in which the cycle structure is realized at a high level with the basic control functions being selectable.

Reference is made to FIG. 10. The minimum cycle structure required for the cooling includes the compressor, the outdoor heat exchanger, the restriction device and the indoor heat exchanger, whereas the cycle structure demanded for the cooling and the heating includes the compressor, the four-way valve for changing over the refrigerant circulating direction, the outdoor heat exchanger, the restriction device and the indoor heat exchanger. Further, the cycle structure demanded for the cooling, the heating and the dehumidification includes the compressor, the four-way valve, the outdoor heat exchanger, the restriction device, the two or duplexed indoor heat exchangers and the dehumidification-dedicated restriction device disposed between the duplexed indoor heat exchangers. Further, the PAM-type inverter is employed with a view to of increasing the rotation number of the electric motor of the compressor to thereby make powerful the cooling, heating and dehumidification effects.

It is assumed that the manufacturer can deliver two types of air conditioners, i.e., the standard type machine composed of the compressor, the four-way valve, the outdoor heat exchanger, the restriction device, the indoor heat exchanger and the dehumidification-dedicated restriction device and the high grade machine which is additionally equipped with the PAM control function and that these air conditioners are sold at different prices.

It is further presumed that only the cooling function is incorporated in both the air conditioners. In other words, in the initial state, the four-way valve is set to the cooling side with the dehumidification-dedicated restriction device being set to the open state. Besides, in the high grade machine, the PAM control function is invalidated (making it possible to perform the power factor control).

The customer purchased selectively the standard type machine can select three basic functions, i.e., the heating, dehumidification and/or the heating/dehumidification function as the basic function to be added to the cooling function. When the heating is selected as the basic function to be added, the program for enabling operation of the four-way valve is installed to reverse the refrigerant circulating direction when compared with that for the cooling. Further, the program for defrosting the outdoor heat exchanger can be installed for operating the four-way valve reversely to the heating operation. Needless to say, the control functions for the restriction device and others appended are also set up. However, the dehumidification-dedicated restriction device remains opened.

When the basic function including dehumidification is selected, the function of controlling the dehumidification-dedicated restriction device and the function of opening the restriction device are set.

When the high grade machine is selected for purchase, the PAM-control function can be utilized, which contributes to making powerful the selected basic control function. Incidentally, the PAM-control can be utilized only in the dehumidifying operation.

The other additional functions are substantially same as those described hereinbefore. It is possible to select the additional function corresponding to the selected basic control function.

As can now be understood from the foregoing, by adopting the arrangement which makes it possible to customize later on the control method for the air conditioner, the customer is now in the position to purchase at a low price the air conditioner which is capable of realizing the air conditioning state suited most appropriately to the customer by sparing loading of the unwanted control software. Moreover, when a new control method has been developed, the air conditioner can further be customized by enhancing the conformability of operation while suppressing power consumption.

In the foregoing, description has been made concerning the system or scheme for updating the control software for the air conditioner. However, the present invention is never restricted to the updating of the control software for the air conditioner but can find application to other electric/electronic appliance such as refrigerator, washing machine, cleaner, drying tumbler, microwave oven and the like, for updating the control methods therefor easily without troubling the customer.

Further, the concept of manufacturing a product after updating a new control method and a customizing the control method in conformance with the customer's desires can equally be applied to the electric/electronic appliance such as e.g. refrigerator, washing machine, cleaner, drying tumbler, microwave oven and the like substantially to the same advantageous effect, needless to say.

As is apparent from the above, in view of the fact that development of software is performed more speedily when compared with the hardware, there arises a case that only the software is to be updated without modifying the hardware. In that case, according to the teachings of the invention incarnated in the embodiments described above, it is possible to automatically update the control software for the customer's air conditioner through the medium of the internet system or with the aid of the memory card after explaining the contents of the new control method dialogically to the customer by telephone and the like to thereby confirm the customer's demand for version-up. Thus, the customer is now in the position to update the control software for his or her air conditioner to the new control software developed one after other to thereby realize the air conditioning more comfortable regardless whether the customer is not familiar with the information technology, i.e., without troubling the customer.

Furthermore, in the air conditioner, only the basic control software is initially installed while determining the specifications of the final product by consulting the customer concerning the control software to be added, to thereby customize the final product by resorting to the control method updating scheme described hereinbefore. Thus, the customer can acquire at a low price the air conditioner which is capable of realizing the air conditioning state suited most appropriately to the customer without loading unwanted control software.

On the other hand, the manufacturer can speedily cope with successive version-up of the control software by updating and managing the information concerning the customers. Of course, the manufacturer can launch a new venture directed to the version-up of the control software specifications and the customization of the control software.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An air conditioner, comprising:
   a connection terminal connected through a signal line to a service center having a storage for storing identification information and control software for said air conditioner; and
   a memory for storing said identification information and said control software transferred from said service center,
   wherein said air conditioner is imparted with a function for determining whether said control software transferred from said service center is usable or not.

2. An air conditioner as claimed in claim 1, wherein said function for determining whether said control software transferred from said service center is usable or not, does so on a basis of identification data including at least one of: air conditioner type data; service center data; software identification data; and air conditioner cycle data.

3. An air conditioner, comprising:
   a connection terminal to which a memory card storing therein control software is connected, said memory card being prepared by a service center having a storage for storing identification information and control software for said air conditioner; and
   a memory for identification information and storing control software stored in memory card delivered from said service center,
   wherein said air conditioner is imparted with a function for determining whether said control software transferred from said service center is usable or not.

4. An air conditioner as claimed in claim 3, wherein said function for determining whether said control software transferred from said service center is usable or not, does so on a basis of identification data including at least one of: air conditioner type data; service center data; software identification data; and air conditioner cycle data.

5. A system comprising:
   a service center including a storage for storing identification information and control software for air conditioners; and
   an air conditioner, including:
      a connection terminal connected through a signal line to said service center having a storage for storing identification information and control software for said air conditioner; and
      a memory for storing said identification information and said control software transferred from said service center,
   wherein said conditioner is imparted with a function for determining whether said control software transferred from said service center is usable or not.

6. A system as claimed in claim 5, wherein said function for determining whether said control software transferred from said service center is usable or not, does so on basis of identification data including at least one of: air conditioner type data; service center data; software identification data; and air conditioner cycle data.

* * * * *